(12) United States Patent
Peuziat

(10) Patent No.: US 10,513,336 B2
(45) Date of Patent: Dec. 24, 2019

(54) RETRACTABLE SUPPORT FOR A SCREEN, AND AIRCRAFT CABIN SEAT COMPRISING SUCH A SUPPORT

(71) Applicant: DASSAULT AVIATION, Paris (FR)

(72) Inventor: Denis Peuziat, Jouy le Moutier (FR)

(73) Assignee: DASSAULT AVIATION, Paris (FR)

(*) Notice: Subject to any disclaimer, the term of this patent is extended or adjusted under 35 U.S.C. 154(b) by 649 days.

(21) Appl. No.: 15/160,235

(22) Filed: May 20, 2016

(65) Prior Publication Data

US 2016/0340042 A1 Nov. 24, 2016

(30) Foreign Application Priority Data

May 22, 2015 (FR) ...................... 15 01070

(51) Int. Cl.
*B64D 11/00* (2006.01)
*B60R 11/02* (2006.01)
*F16M 11/04* (2006.01)
*F16M 13/02* (2006.01)
*B64D 11/06* (2006.01)
*F16M 11/14* (2006.01)
*F16M 11/20* (2006.01)
(Continued)

(52) U.S. Cl.
CPC .... *B64D 11/00153* (2014.12); *B60R 11/0235* (2013.01); *B64D 11/0646* (2014.12); *F16M 11/041* (2013.01); *F16M 11/14* (2013.01); *F16M 11/2071* (2013.01); *F16M 11/24* (2013.01); *F16M 13/02* (2013.01); *B60R 2011/0082* (2013.01); *F16M 2200/028* (2013.01); *F16M 2200/068* (2013.01)

(58) Field of Classification Search
CPC .......... B64D 11/00153; B64D 11/0646; B60R 11/0235; B60R 2011/0082; F16M 11/02
See application file for complete search history.

(56) References Cited

U.S. PATENT DOCUMENTS

| 5,076,524 | A | * | 12/1991 | Reh | ........................ | B60N 2/79 |
| | | | | | | 248/296.1 |
| 5,177,616 | A | * | 1/1993 | Riday | ................ | B64D 11/0015 |
| | | | | | | 248/917 |
| 5,179,447 | A | * | 1/1993 | Lain | ........................ | A47C 7/72 |
| | | | | | | 248/917 |

(Continued)

FOREIGN PATENT DOCUMENTS

| DE | 20 2013 001772 U1 | 3/2013 | |
| DE | 10 2012 005256 A1 | 9/2013 | |
| FR | 3036342 A1 * | 11/2016 | ......... B64D 11/0015 |

OTHER PUBLICATIONS

French Search Report of priority application.

*Primary Examiner* — Anita M King
(74) *Attorney, Agent, or Firm* — Davidson, Davidson & Kappel, LLC

(57) ABSTRACT

A retractable support for a screen, and aircraft cabin seat including such a support are provided. The retractable support for a screen comprises a support arm for the screen and a housing for receiving the arm in a retracted position inside the housing. The housing comprises a mechanism for deploying the arm outside the housing. The support further comprises a compartment defining a cavity for receiving the housing in a retracted position inside the compartment. The housing is mounted movably relative to the compartment between the retracted position and a free position outside the compartment.

20 Claims, 7 Drawing Sheets

(51) Int. Cl.
*F16M 11/24* (2006.01)
*B60R 11/00* (2006.01)

(56) References Cited

U.S. PATENT DOCUMENTS

| | | | | |
|---|---|---|---|---|
| 5,195,709 A * | 3/1993 | Yasushi | | B64D 11/0646 248/280.11 |
| 5,374,104 A * | 12/1994 | Moore | | A47C 7/72 297/188.16 |
| 5,398,991 A * | 3/1995 | Smith | | A47C 7/72 248/919 |
| 5,547,248 A * | 8/1996 | Marechal | | B60N 2/79 297/188.17 |
| 5,732,919 A * | 3/1998 | Rosen | | B64D 11/0015 248/274.1 |
| 6,007,036 A * | 12/1999 | Rosen | | B60R 11/0235 224/281 |
| 6,663,155 B1 * | 12/2003 | Malone | | B60R 11/0229 224/539 |
| 7,261,266 B2 * | 8/2007 | Satterfield | | B60R 11/0235 248/284.1 |
| 9,352,674 B2 * | 5/2016 | Suhre | | B64D 11/06 |
| 2003/0151336 A1 * | 8/2003 | Freeman | | A47B 21/03 312/310 |
| 2003/0234550 A1 * | 12/2003 | Brooks | | B60R 7/04 296/24.46 |
| 2006/0219857 A1 | 10/2006 | Satterfield | | |
| 2007/0290536 A1 * | 12/2007 | Nathan | | B60K 35/00 297/217.3 |
| 2014/0300147 A1 * | 10/2014 | Suhre | | B64D 11/06 297/170 |
| 2017/0021928 A1 * | 1/2017 | Satterfield | | B64D 11/00153 |

* cited by examiner

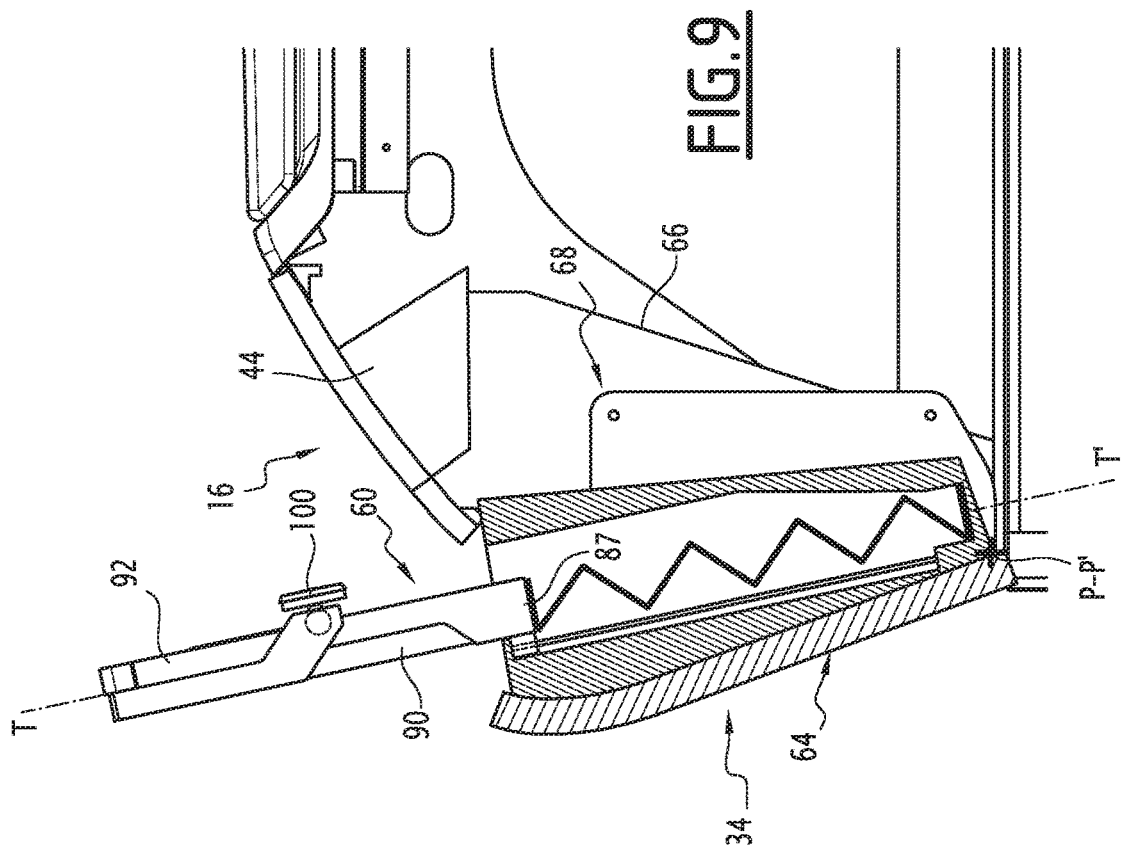
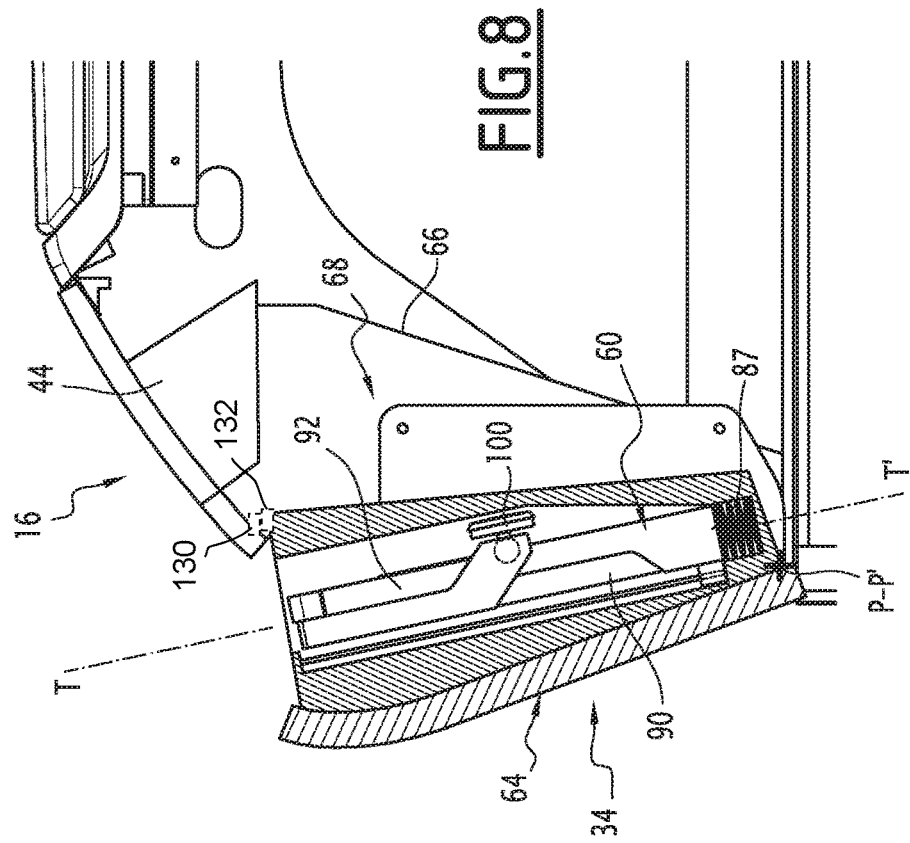

RETRACTABLE SUPPORT FOR A SCREEN, AND AIRCRAFT CABIN SEAT COMPRISING SUCH A SUPPORT

This claims the benefit of French Patent Application FR 15 01070, filed May 22, 2015 and hereby incorporated by reference herein.

The present invention relates to a retractable support for a screen, of the type comprising a support arm for the screen and a housing for receiving the arm in a retracted position inside the housing, the housing comprising a mechanism for deploying the arm outside the housing.

The present invention also relates to a cabin seat for an aircraft comprising such a support. Such a seat is designed to be mounted in an aircraft cabin to contribute to the comfort of the occupants of the cabin and complies with the safety standards mandated for equipment onboard aircraft.

BACKGROUND

Aircraft cabins are commonly equipped with screens intended for use by passengers. These screens can be intended to inform passengers of flight parameters, but may also allow them to access multimedia content.

These screens are often embedded in a stationary element of the cabin, which makes their consultation inconvenient for passengers. Support members have therefore been developed for these screens, comprising an arm equipped with an end for fastening to a stationary element of the cabin and an articulation end to the screen. These support members are generally suitable for supporting the screen across from the cabin seat, so as to allow easy consultation of the screen by a passenger seated in said seat.

For safety reasons, aircraft certification requires that each screen present in the aircraft be retracted or stored during certain critical flight phases of the aircraft, in particular during takeoff and landing. Also in some cases, the passenger may wish, for his own comfort, for the screen to be retracted, for example so that the screen does not hinder his movement inside the aircraft.

As a result, the support members are designed to allow the movement of the screen between a usage position across from the cabin seat and a storage position. One known storage position is a position retracted inside an armrest of the seat. However, it is not always possible to provide such a storage position in the armrest of the seat when the armrest already incorporates other equipment, for example a cup holder or a control interface.

For several years, with the rapid growth of touch-sensitive tablets, passengers increasingly often board aircraft with their own touch-sensitive tablets, which they generally wish to consult during the flight. Most often, passengers do not have a support available to them, and must therefore place their tablets on their laps, which requires them to continuously tilt their head downward and may cause dorsal or cervical pain over time. Furthermore, the tablet can easily fall on the floor of the cabin and be damaged in case of sudden acceleration or deceleration of the aircraft, for example when the latter is in a turbulent zone.

In order to offset these drawbacks, tablet support devices for aircraft have recently been developed.

These support devices generally assume the form of an articulated arm having a proximal end fastened to the lateral rim of the cabin (better known as the "side ledge") and a distal end provided with a jaw having dimensions appropriate for grasping and holding different models of tablets. This arm having to be stored during critical flight phases, the arm is most often able to be disassembled, which poses the problem of the storage of that arm, as well as the tablet that it supports. Furthermore, the large bulk of the side ledge, which already incorporates many pieces of equipment, most often prevents the retraction of the tablet and its support arm in the side ledge.

SUMMARY OF THE INVENTION

One aim of the invention is to allow the integration of a retractable support for a screen into a seat armrest incorporating other equipment, the support disappearing inside the armrest when it is retracted. Other aims are to allow the storage of the screen in the armrest, and easy handling of the retractable support.

To that end, the invention provides a retractable support of the aforementioned type, wherein the support further comprises a compartment defining a cavity for receiving the housing in a retracted position inside the compartment, the housing being mounted movably relative to the compartment between said retracted position and a free position outside the compartment.

According to specific embodiments of the invention, the retractable support also comprises one or more of the following features, considered alone or according to any technically possible combination(s):

- the housing is mounted pivoting relative to the compartment around a pivot axis for the movement of the housing between its retracted and free positions;
- the deployment mechanism comprises a guide device for guiding the arm in translation relative to the housing in a translation direction;
- the pivot axis is substantially orthogonal to the translation direction;
- the arm is an articulated arm;
- the arm comprises first and second segments articulated relative to one another such that the second segment pivots relative to the first segment around a first rotation axis between a compact configuration, in which the first and second segments are oriented substantially parallel relative to one another, and an extended configuration, in which the first and second segments form an angle relative to one another;
- the first segment is elongated in an elongation direction substantially parallel to the translation direction;
- the first segment is elongated in an elongation direction substantially orthogonal to the first rotation axis;
- the first segment defines a proximal articulation of the arm to the housing, and the second segment defines a distal end for fastening the screen to the arm;
- the first segment is elongated in an elongation direction and comprises a first rigid part, defining a first longitudinal end of the first segment, and a second rigid part, defining a second longitudinal end of the first segment, the first and second parts being mounted rotatably relative to one another around a second rotation axis, said second rotation axis being substantially parallel to the elongation direction;
- the second segment is articulated to the second part of the first segment, the first longitudinal end of the first segment constituting the proximal end of the arm;
- the retractable support comprises a snap-locking mechanism for locking the arm in the retracted position, said locking mechanism being suitable for being unlocked under the effect of a pressure exerted on the arm toward the bottom of the housing;

the retractable support comprises a snap-blocking mechanism to block the housing in the retracted position, said blocking mechanism being suitable for being unblocked under the effect of a pressure exerted on the housing toward the bottom of the cavity;

the retractable support comprises a fastening device for fastening the screen to the arm; and the fastening device is removable.

The invention also provides a cabin seat for an aircraft comprising a retractable support as defined above.

According to one particular embodiment of the invention, the cabin seat also comprises the following feature:

the cabin seat comprises an armrest in which the compartment of the retractable support is integrated, the housing of the retractable support including a wall which, when the housing is in the retracted position, defines at least part of a façade of the armrest.

BRIEF DESCRIPTION OF THE DRAWINGS

Other features and advantages of the invention will appear upon reading the following description, provided solely as an example and done in reference to the appended drawings, in which:

FIG. 8 is a view similar to FIG. 7, the retractable support being in a first intermediate position between its retracted and deployed configurations, FIG. 9 is a view similar to FIG. 7, the retractable support being in a second intermediate position between its retracted and deployed configurations.

DETAILED DESCRIPTION

Figure 1:
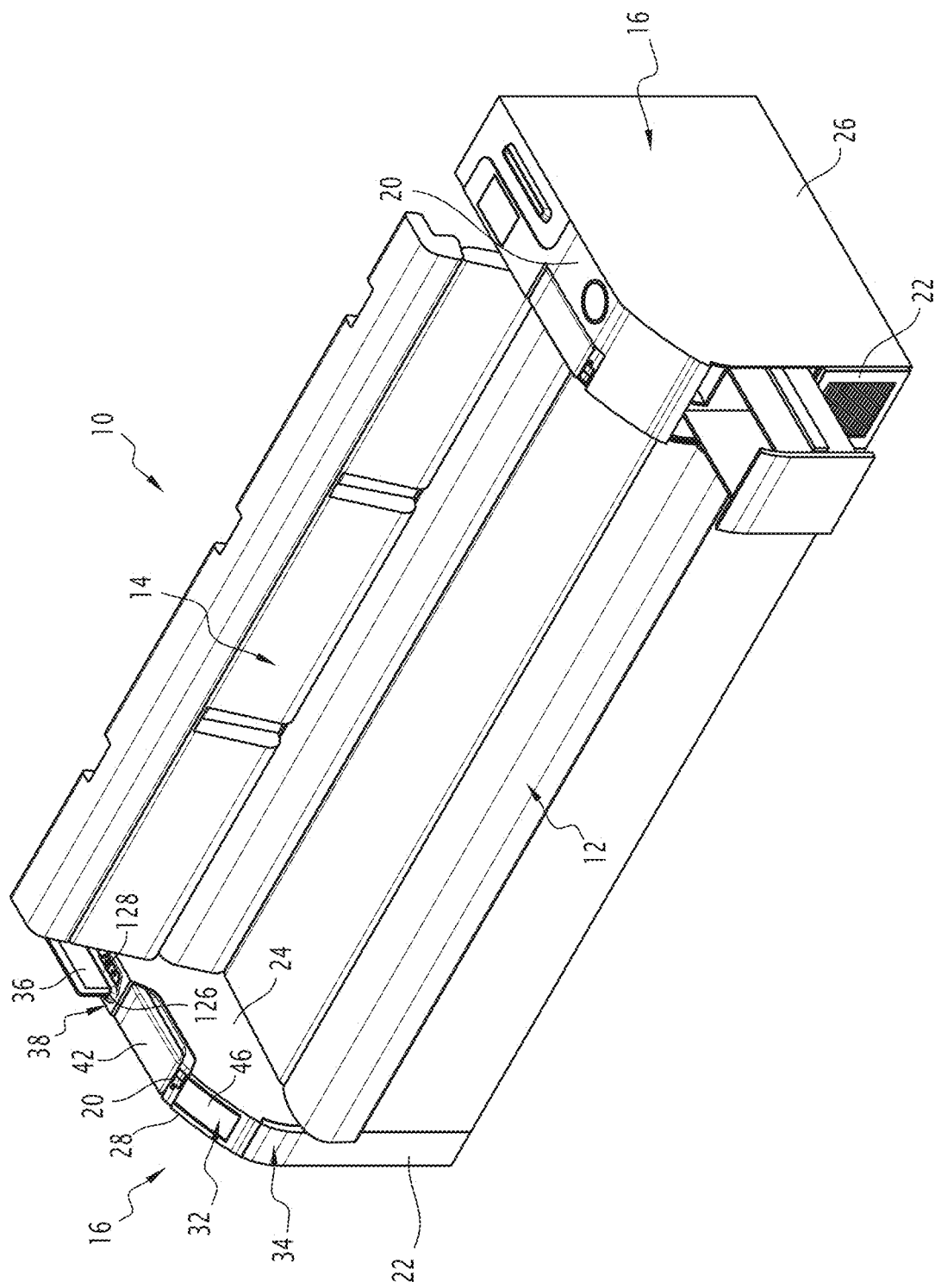
FIG. 1 is a perspective, three-quarters front view of a cabin seat according to an embodiment of the invention.

The cabin seat 10 for an aircraft, shown in FIG. 1, is intended to be mounted in an aircraft cabin to contribute to the comfort of the occupants of the cabin. To that end, the cabin seat 10 is in accordance with the safety standards mandated for equipment onboard aircraft.

In the illustrated example, the cabin seat 10 is a sofa. Alternatively, the cabin seat is an armchair.

The cabin seat 10 comprises, in a known manner, a seat bottom 12, a backrest 14 positioned behind the seat bottom 12, and armrests 16, preferably stationary, laterally framing the seat bottom 12.

For the rest of the description, the orientation terms are defined as follows:

the term "horizontal" refers to any direction oriented substantially parallel to the seat bottom 12, the term "vertical" refers to any direction substantially orthogonal to the seat bottom 12, and the term "transverse" refers to any direction oriented substantially parallel to the seat bottom 12 and the backrest 14.

Each arm rest 16 has an upper surface 20, substantially horizontal, for resting a forearm of a passenger seated on the seat bottom 12, a front façade 22, substantially vertical and oriented opposite the backrest 14, an inner flank 24, substantially vertical and oriented toward the seat bottom 12, an outer flank 26, substantially vertical and oriented opposite the seat bottom 12, and an inclined surface 28 for connecting the upper surface 20 to the front façade 22.

One of the armrests 16 integrates a control interface 30 (FIG. 2), a retractable cup holder 32, a retractable support 34 for the screen 36, and a storage space 38 for the screen 36.

Figure 2:
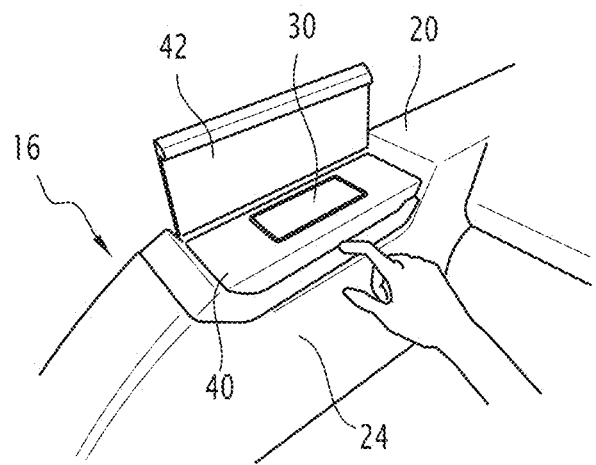
FIG. 2 is a perspective view of an armrest of the cabin seat of FIG. 1, a cover for concealing a control interface of the armrest being in an open position.

In reference to FIG. 2, the control interface 30 is designed to control comfort equipment for the aircraft cabin, said comfort equipment typically comprising ventilation of the aircraft cabin and/or a lighting system of the aircraft cabin. To that end, the control interface 30 comprises at least one control button, the actuation of which influences the operation of at least one of said pieces of comfort equipment. In the illustrated example, the control interface 30 is formed by a touch-sensitive panel, and the control buttons are made up of different regions of the touch-sensitive panel.

The control interface 30 is in particular housed in a hollow 40 formed in the upper surface 20 of the armrest 16. A cover 42 for concealing the control interface 30 is articulated to the armrest 16. This cover 42 is movable between a closed position covering the control interface 30, shown in FIG. 1, and an open position freeing the control interface 30, shown in FIG. 2. Preferably, the cover 42 is flush with the upper surface 20 when it is in its closed position.

In the illustrated example, the cover 42 is mounted pivoting relative to the armrests 16 between its open and closed positions.

Figure 3:
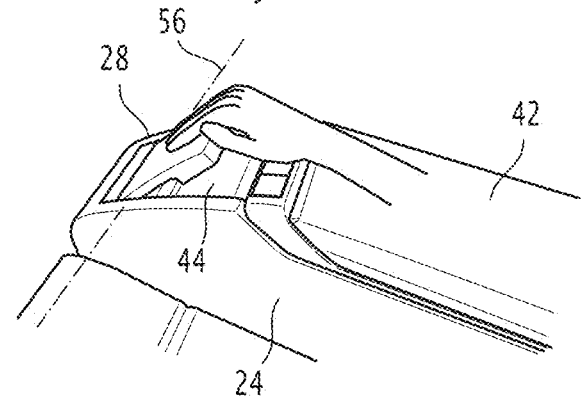
FIG. 3 is a perspective view of a retractable cup holder integrated in the armrest of FIG. 2, the cup holder being in a first intermediate position between its retracted and deployed positions.
Figure 4:
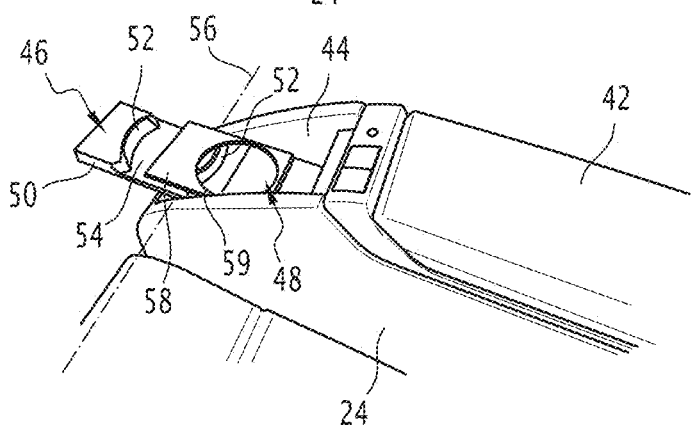
FIG. 4 is a view similar to that of FIG. 3, the cup holder being in a second intermediate position between its retracted and deployed positions.
Figure 5:
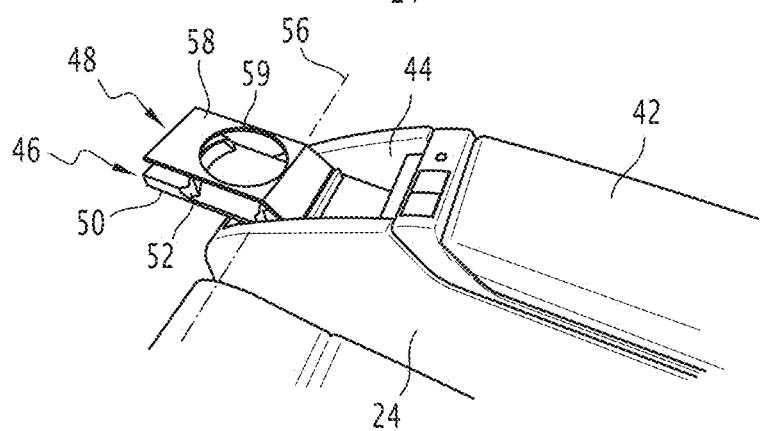
FIG. 5 is a view similar to that of FIG. 3, the cup holder being in its deployed position.

In reference to FIGS. 3 to 5, the cup holder 32 is housed in a recess 44 emerging in the connecting surface 28. The cup holder 32 comprises a bottom portion 46 and an upper portion 48.

The bottom portion 46 comprises a substantially flat panel 50, and two ribs 52 in the shape of an arc of circle both protruding from a same large face 54 of the panel 50. The ribs 52 are positioned substantially on a same circular contour (not shown).

The bottom portion 46 is mounted pivoting relative to the armrests 16 between a closed position, shown in FIG. 1, in which the bottom portion 46 closes the recess 44, the large face 54 being oriented toward the inside of the recess 44, and an open position, shown in FIG. 4, in which the panel 50 extends substantially horizontally away from the recess 44. The pivot axis 56 of the bottom portion 46 is in particular a substantially transverse axis, and the bottom portion 46 extends above the façade 22 when it is in the open position.

Advantageously, as shown, the bottom portion 46 is flush with the connecting surface 28 when it is in the closed position.

Preferably, the cup holder 32 also includes a member for returning the bottom portion 46 toward its open position, and a mechanism for locking the bottom portion 46 in the closed position, said locking mechanism being a snap-locking mechanism suitable for being unlocked under the effect of the pressure exerted on the bottom portion 46 toward the bottom of the recess 44. Such locking mechanisms being known and commonly used in pushbuttons and retractable ballpoint pens, this locking mechanism will not be described in more detail here.

The upper part 48 comprises a substantially planar plate 58 provided with a passage 59 emerging in the two opposite large faces of the plate 58.

The upper part 48 is articulated to the bottom portion 46 between a position retracted inside the recess 44, shown in FIG. 4, and a position deployed outside the recess 44, shown in FIG. 5. When the upper part 48 is in the deployed position, the plate 58 is substantially parallel to the panel 50, and the center of the passage 59 is substantially vertically aligned with the center of the contour in which the ribs 52 are positioned.

Preferably, the cup holder 32 also includes a member for returning the upper part 48 toward its deployed position, and the articulation mechanism between the bottom portion 46 and the upper portion 48 is adapted to automatically return the upper part 48 toward its retracted position when the bottom portion 46 is maneuvered from its open position toward its closed position.

Figure 6:
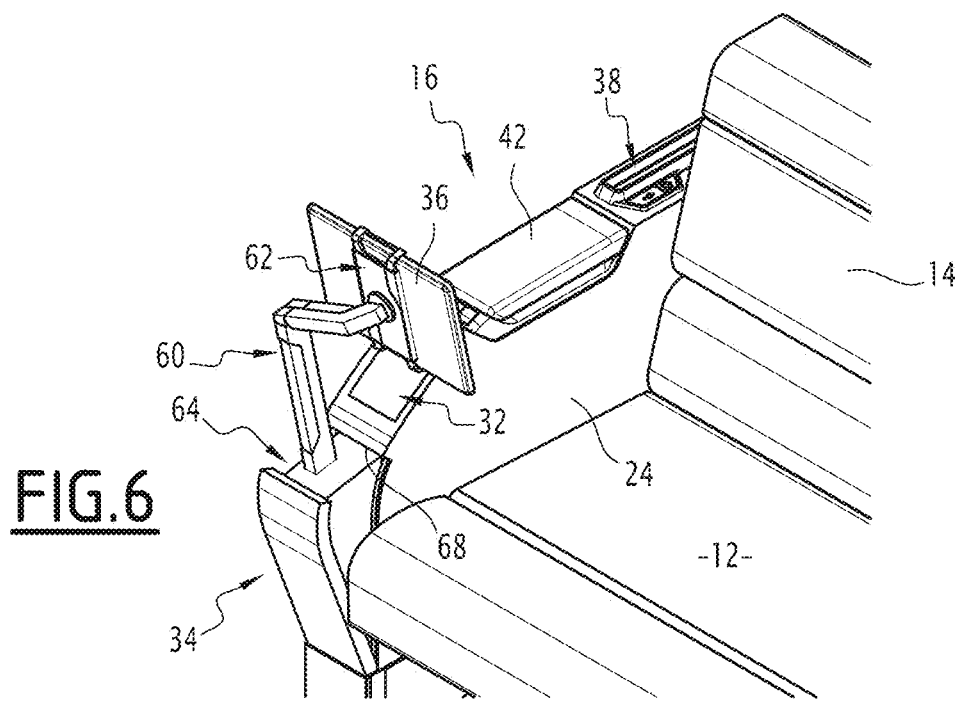
FIG. 6 is a view similar to that of FIG. 2, a retractable support integrated into the armrest being in a deployed configuration, and a screen being fastened to said retractable support.

In reference to FIGS. 1 and 6, the retractable support 34 is movable between a configuration retracted inside the armrest 16, shown in FIG. 1, and a deployed support configuration of the screen 36, shown in FIG. 6.

Figure 7:
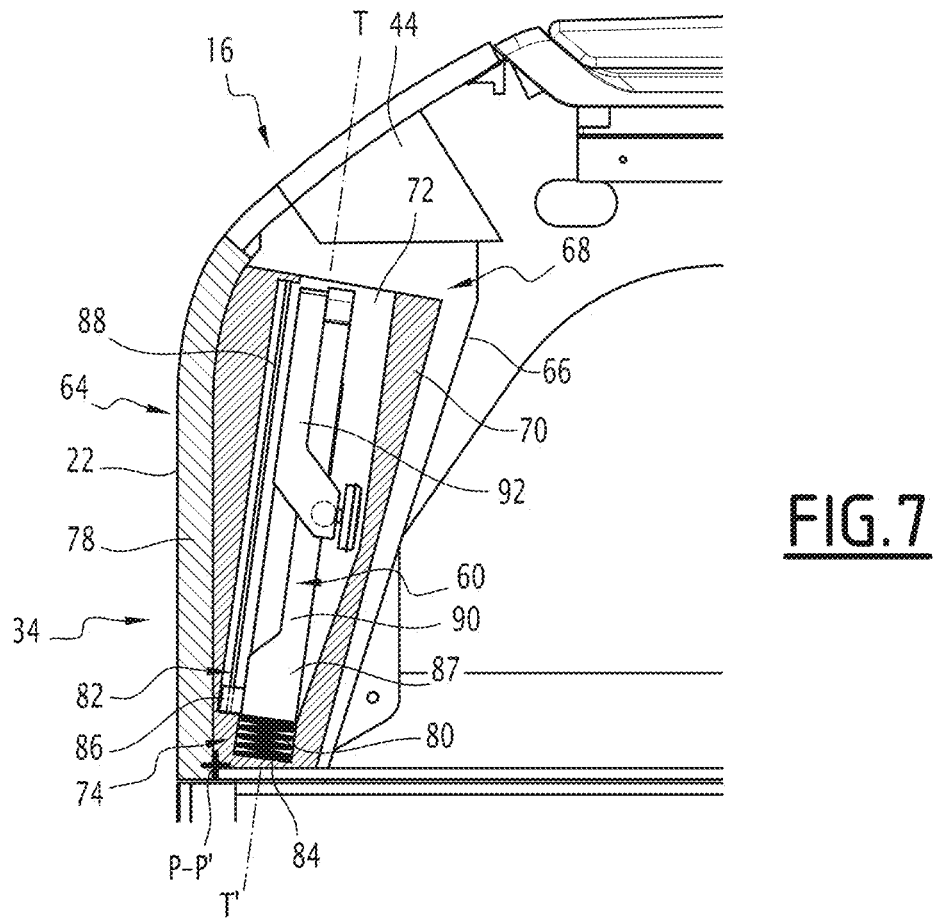
FIG. 7 is a longitudinal sectional view of the armrest of FIG. 2, the retractable support being in a retracted configuration.

To that end, the retractable support 34 comprises a support arm 60 of the screen 36, a device 62 for fastening the screen 36 to the arm 60, a housing 64 for receiving the arm 60 in a position retracted inside the housing 64, shown in FIGS. 7 and 8, and a compartment 66 (FIG. 7), integrated into the armrest 16, defining a cavity 68 for receiving the housing 64 in a position retracted inside the compartment 66.

Figure 10:
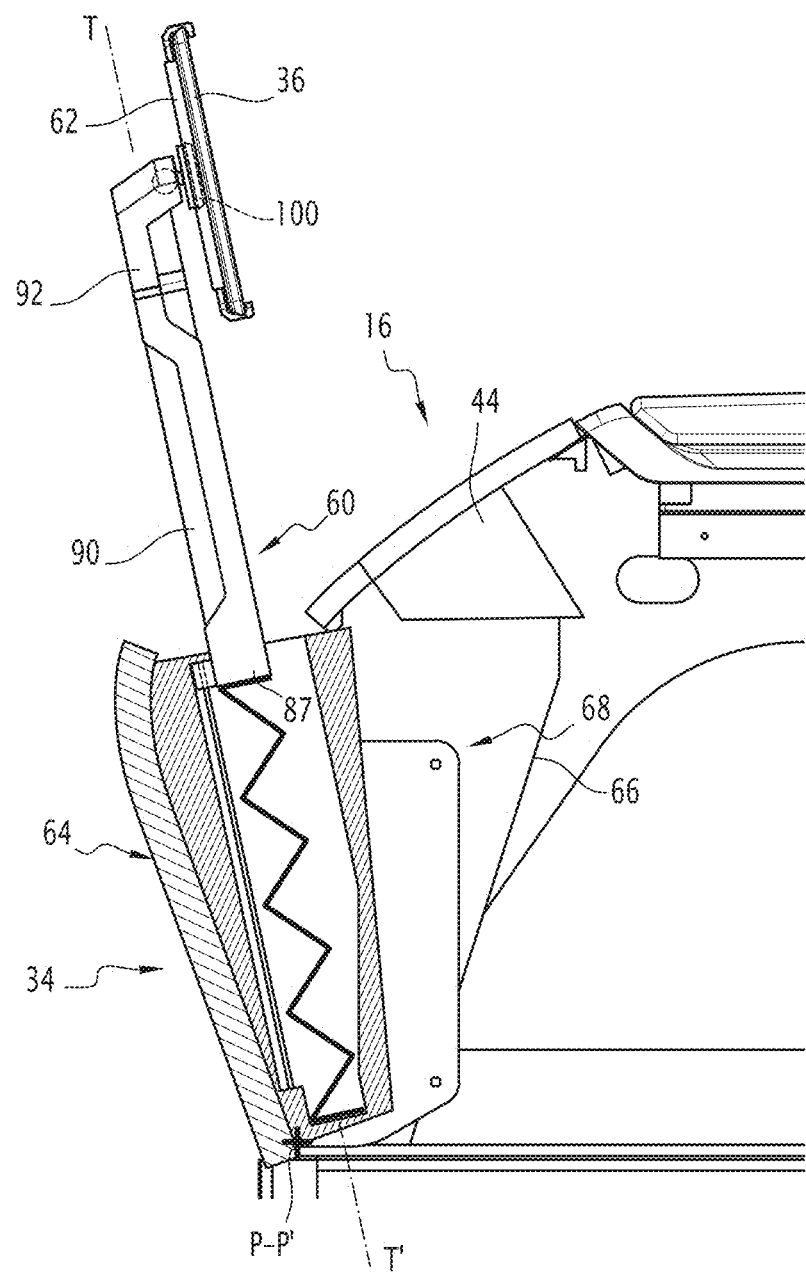
FIG. 10 is a view similar to that of FIG. 7, the retractable support being in its deployed configuration.

In reference to FIGS. 7 to 10, the housing 64 is mounted pivoting around a pivot axis P-P' that is transverse relative to the compartment 66 between said retracted position, shown in FIG. 7, and a position freed outside the compartment 66, shown in FIGS. 8 to 10.

Advantageously, the compartment 66 comprises a member for turning the housing 64 toward its free position, and a mechanism for blocking the housing 64 in the retracted position, said blocking mechanism being a snap-block or snap-blocking mechanism suitable for being unlocked under the effect of a pressure exerted on the housing 64 toward a bottom of the cavity 68. Such blocking mechanisms being known and commonly used in pushbuttons and retractable ballpoint pens, this blocking mechanism will not be described in more detail here.

Preferably, as shown schematically in FIG. 8, the compartment 66 also comprises a stop 130 suitable for cooperating with a complementary stop 132 formed on the housing 64, to prevent the pivoting of the housing 64 by an angle larger than 20° between its retracted and free positions.

The housing 64 comprises a body 70 defining an inner space 72 for receiving the arm 60 in the retracted position. The housing 64 also comprises a deployer or mechanism 74 for deploying the arm 60 outside the housing 64, as well as a mechanism 76 (FIG. 11) for locking the arm 60 in the retracted position.

The body 70 comprises a wall 78 that defines a part of the façade 22 when the housing 64 is in the retracted position. The pivot axis P-P' is located at the base of said wall 78.

The deployment mechanism 74 comprises a return member 80 for returning the arm 60 toward a deployed position outside the housing 64, shown in FIGS. 9 and 10, and a guide or device 82 for guiding the arm 60 in translation relative to the housing 64 between its retracted and deployed positions along a translation direction T-T' orthogonal to the pivot axis P-P'. The arm 60 is thus mounted translatably along the direction T-T' relative to the housing 64 between its retracted and deployed positions.

In the illustrated example, the return member 80 is formed by a spring inserted between the arm 60 and a bottom 84 of the receiving space 72. Also in the illustrated example, the guide device 82 is formed by a pin 86 secured to a proximal end 87 of the arm 60 and mounted translatably on a guide rail 88 secured to the body 70 and oriented in the translation direction T-T'.

Figure 11:
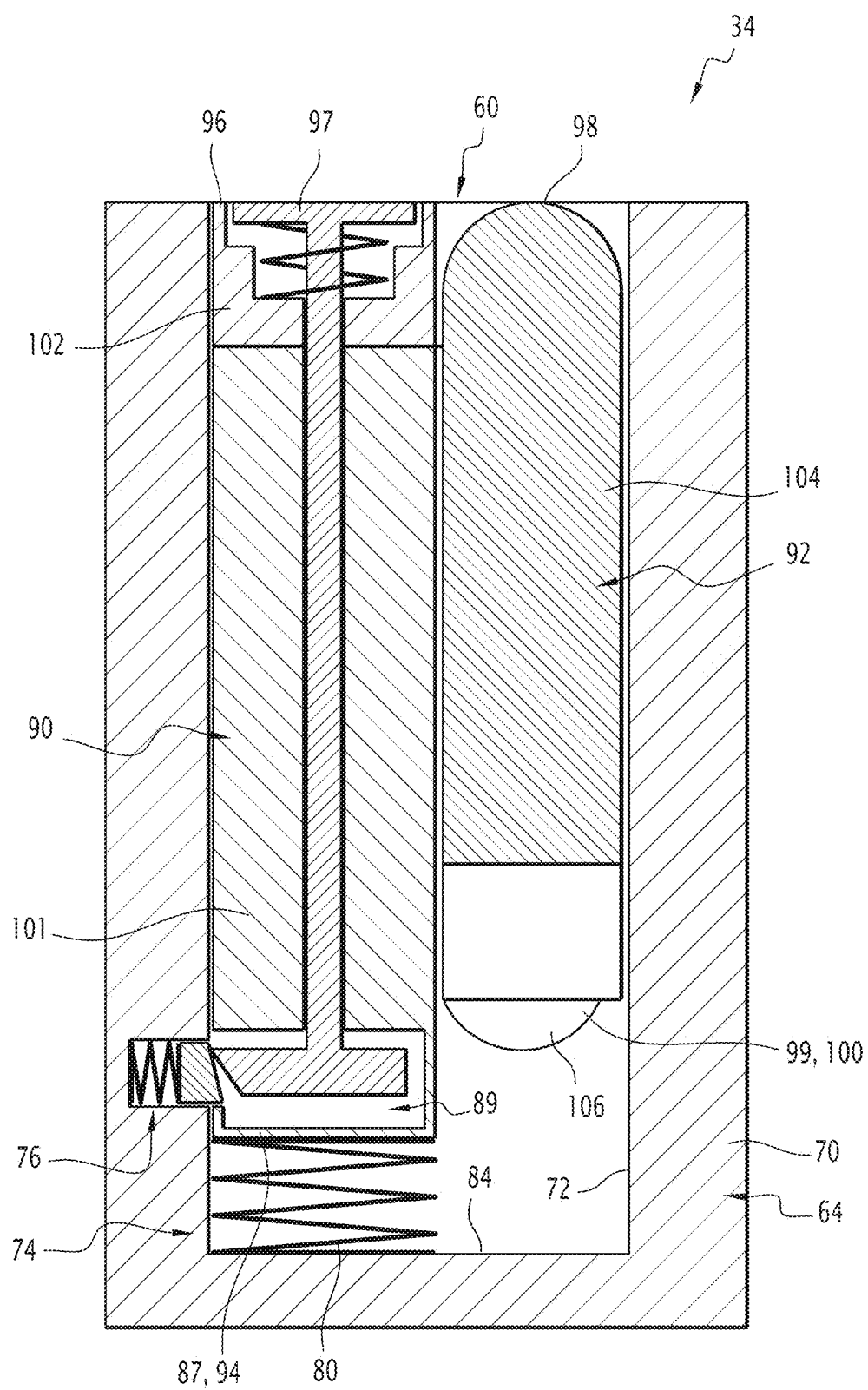
FIG. 11 is a cross-sectional view of the retractable support, a support arm of the retractable support being in the retracted position.

As illustrated in FIG. 11, the locking mechanism 76 is preferably a snap-lock or snap-locking mechanism.

In the illustrated example, the housing 64 also comprises an unlocking mechanism 89, suitable for unsnapping the locking mechanism 76.

Alternatively (not shown), the locking mechanism 76 is suitable for being unlocked under the effect of a pressure exerted on the arm 60 in the translation direction T-T', toward the bottom 84 of the receiving space 72. Such locking mechanisms being known and commonly used in pushbuttons and retractable ballpoint pens, this locking mechanism will not be described in more detail here.

Preferably, the housing 64 also comprises a USB port for supplying electricity to the screen 36.

Figure 12:
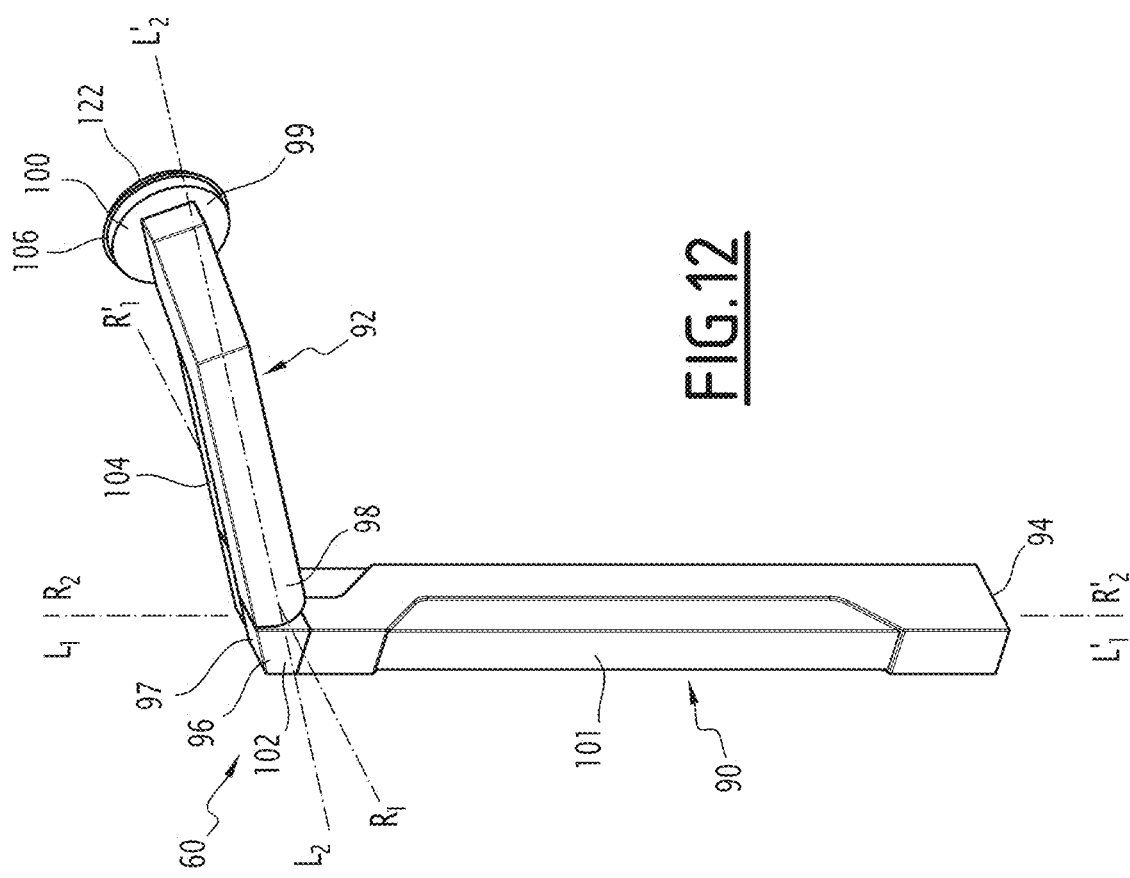
FIG. 12 is a perspective view of the support arm.

In reference to FIG. 12, the arm 60 is an articulated arm comprising first and second segments 90, 92.

The first segment 90 is elongated in a first elongation direction L1-L1' and has a first longitudinal end 94 and a second longitudinal end 96 opposite one another along the first elongation direction L1-L1'. It in particular has a substantially parallelepiped shape.

The first longitudinal end 94 constitutes the proximal articulation end 87 of the arm 60 to the housing 64. The second longitudinal end 96 constitutes an articulation end of the first segment 90 to the second segment 92. The second end 96 preferably bears, as shown, an actuating button 97 for the locking mechanism 89.

The first elongation direction L1-L1' is substantially parallel to the translation direction T-T'.

The second segment 92 is elongated in a second elongation direction L2-L2' and has a first longitudinal end 98 and a second longitudinal end 99 opposite one another in the second elongation direction L2-L2'.

The first longitudinal end 98 constitutes an articulation end of the second segment 92 to the first segment 90.

The second longitudinal end 99 constitutes an end 100 for fastening the screen 36 to the arm 60.

The first and second segments 90, 92 are articulated relative to one another such that the second segment 92 pivots relative to the first segment 90 around a first rotation axis R1-R1' orthogonal to the first and second longitudinal directions L1-L1', L2-L2' between a compact configuration of the arm 60, shown in FIGS. 7 to 9, and an extended configuration of the arm 60, shown in FIG. 10. In the compact configuration of the arm 60, the first and second segments 90, 92 are oriented substantially parallel relative to one another, i.e., the first and second longitudinal directions L1-L1', L2-L2' are substantially parallel to one another. In the extended configuration of the arm 60, the first and second segments 90, 92 form an angle relative to one another, i.e., the first and second longitudinal directions L1-L1', L2-L2' are secant.

To that end, the first and second segments 90, 92 are articulated to one another by a first pivot link having as axis the first rotation axis R1-R1'.

Preferably, said first pivot link is suitable for the protruding angle formed between the first and second segments 90, 92 when they are in the extended configuration to be comprised between 110° and 120°. To that end, the first pivot link comprises a stop for preventing the pivoting of the second segment 92 relative to the first segment 90 beyond the position corresponding to the extended configuration.

Advantageously, the first pivot link comprises a system for keeping the arm 60 in the extended configuration, suitable for preventing the arm 60 from returning to the compact configuration under the full effect of the weight of the second segment 92 and the screen 36. To that end, the maintaining system is for example made up of an indexed system with beads or notches.

Alternatively, the first pivot link has a significant friction coefficient so as to allow the arm 60 to be kept in the extended configuration owing solely to the effect of the frictional force.

The first segment 90 in particular comprises a first rigid part 101 and a second rigid part 102 that are mounted rotatably relative to one another around a second rotation axis R2-R2' that is substantially parallel to the first elongation direction L1-L1'. To that end, the first and second parts 101, 102 are articulated to one another by a second pivot link having as axis the second rotation axis R2-R2'.

Preferably, said second pivot link comprises stops for preventing the first and second parts 101, 102 from pivoting by an angle greater than 180° relative to one another. Advantageously, the stops are positioned such that the position of the second part 102 midway between said stops corresponds to a position in which, when the arm 60 is in the extended configuration, the second elongation direction L2-L2' has a transverse component.

The first part 101 defines the first longitudinal end 94 of the first segment 90, and the second part 102 defines the second longitudinal end 96 of the first segment 90.

The second segment 92 also comprises a first rigid part 104 and a second rigid part 106 that are articulated relative to one another by an articulated link (not shown). The first part 104 defines the first longitudinal end 98 of the second segment 92, and the second part 106 defines the second longitudinal end 99 of the second segment 92.

The articulated link is suitable for allowing a rotation of the second part 106 relative to the first part 104 around the second elongation axis L2-L2' and around at least one other axis not parallel to the second elongation axis L2-L2'. Advantageously, said other axis is suitable for being substantially parallel to the rotation axis R2-R2' when the arm 60 is in the extended configuration.

In the illustrated example, the articulated link is made up of a ball joint link, so as to allow the rotation of the second part 106 relative to the first part 104 around three non-coplanar axes of the space. The articulated link is thus suitable for making it possible to orient the screen 36 both in landscape and portrait modes.

Alternatively (not shown), the articulated link is made up of a finger ball joint link, typically formed by a part mounted pivoting around a first axis relative to the first part 104 and mounted pivoting around a second axis, orthogonal to the first axis, relative to the second part 106.

Preferably, the articulated link is suitable for allowing the rotation of the second part 106 relative to the first part 104 around the second elongation axis L2-L2' by an angle at least equal to 55°, and for allowing the rotation of the second part 106 relative to the first part 104, when the arm 60 is in the extended configuration, around an axis substantially parallel to the second rotation axis R2-R2', by an angle at least equal to 180°.

Figure 13:
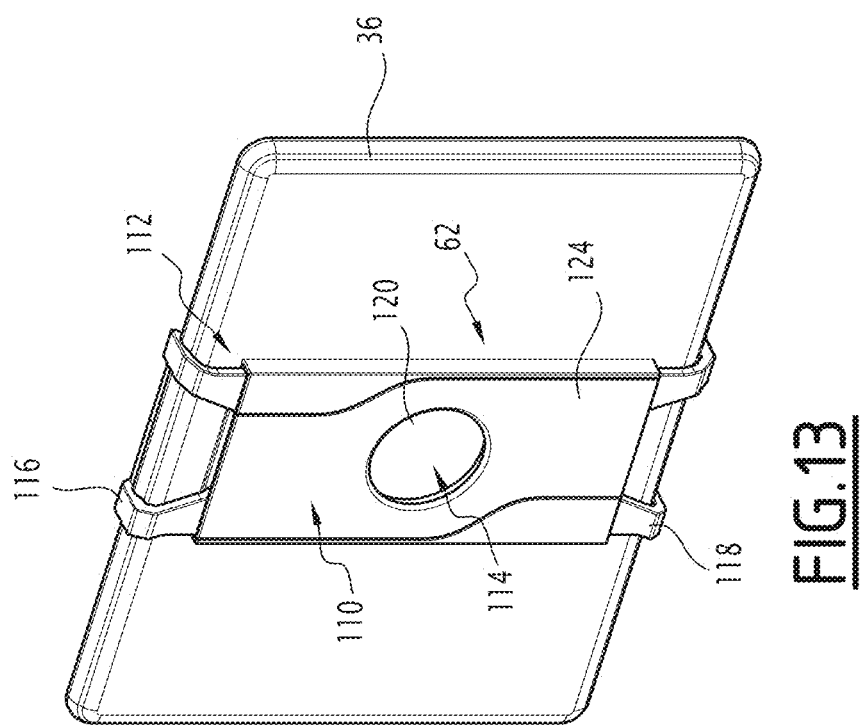
FIG. 13 is a perspective view of a screen fastened to a fastening device of the retractable support.

In reference to FIG. 13, the fastening device 62 comprises a body 110, a fastening member 112 for fastening the screen 36 to the body 110, and a member 114 for securing the body 110 to the fastening end 100 of the arm 60.

In the illustrated example, the screen 36 is a personal touch-sensitive tablet. The fastening member 112 is therefore a reversible fastening member suitable for a passenger to be able to attach the screen 36 to the body 110 and detach the screen 36 from the body 110 without using any tools.

To that end, the fastening member 112 comprises at least one pair of jaws 116, 118 mounted translatably relative to the body 110 between a configuration releasing the screen 36, in which the jaws 116, 118 are separated from one another along an axis, and a configuration pinching the screen 36, in which the jaws 116, 118 are brought closer to one another along said axis. A blocking member makes it possible to keep the jaws 116, 118 in the pinching configuration. In the illustrated example, the fastening member 112 comprises a single pair of jaws 116, 118. Alternatively (not shown), the fastening member 112 comprises two pairs of jaws 116, 118, the axes of said pairs of jaws being oriented substantially perpendicular to one another, said pairs of jaws being able to be maneuvered jointly using a shared control member.

Alternatively, the screen 36 is permanently fastened to the body 110. The fastening member 112 is then typically made up of screws, suction cups, clipping elements, or an adhesive.

The fastening device 62 is removable, i.e., it is suitable for being fastened to the arm 60 and detached from the arm 60 without using any tools. The securing member 114 is therefore a reversible securing member suitable for cooperating with the fastening end 100 of the arm 60 so as to allow the securing of the fastening element 62 to the fastening end 100 and the detachment of the fastening element 62 from the fastening end 100 without using any tools.

To that end, the reversible securing member 114 comprises, in the illustrated example, a magnet 120 fastened to the body 110 and suitable for cooperating with a corresponding magnet 122 (FIG. 11) integrated into the fastening end 100. The magnet 120 is in particular positioned on a first large face 124 of the body 110 opposite a second large face for receiving the screen 36.

Alternatively (not shown), the reversible securing member 114 comprises a rib fastened to the body 110 and suitable for cooperating with a complementary groove formed in the fastening end 100. Also alternatively (not shown), the reversible securing member 114 comprises a male or female element of a snap-securing member, said male or female element being suitable for cooperating with a complementary male or female element integrated into the fastening end 100.

It will be noted that the cavity 68 of the compartment 66 is only suitable for receiving the housing 64 in the retracted position when the arm 60 is retracted inside the housing 64, and that the space 72 of the housing 64 is only suitable for receiving the arm 60 when the arm 60 is in the retracted configuration and the fastening device 62 is detached from the arm 60. Thus, when the support 34 is in the retracted configuration, then not only is the housing 64 in the retracted position, but the arm 60 is also in the retracted configuration and the retracted position.

Returning to FIG. 1, the storage space 38 comprises a recess 126 emerging through an opening 128 in the upper surface 20 of the armrest 16. The recess 126 is oversized to receive the fastening device 62 and the screen 36 fastened to the fastening device 62 in a position stored inside the recess 126. The recess 126 is also sized so that the screen 36 protrudes outside the opening 128 when it is in the storage position; preferably, the recess 126 is sized so that the excess height of the screen 36 does not exceed 60 mm.

The storage space 38 further comprises a system for ejecting the screen 36 outside the recess 126. This ejection system typically comprises a plate positioned in the recess 126 between a bottom of the recess 126 and the opening 128 and mounted movably in the recess 126 between a pushed in position, in which the plate is separated from the opening 128, and a raised position, in which the plate is close to the opening 128. Advantageously, the ejection system also comprises a member for turning the plate toward its raised position, a mechanism for locking the plate in the pushed in position, said locking mechanism for example being a snap-locking mechanism, and an unlocking mechanism (not shown), typically suitable for unsnapping the locking mechanism, said unlocking mechanism comprising an actuating button positioned on the upper surface 20 near the opening 128.

Advantageously, the armrest 16 also comprises a USB port (not shown), positioned near the storage space 38 or in the storage space 38, to supply the screen 36 with electricity when it is positioned in the storage space 38.

The manipulation of the retractable support 34 will now be described, in reference to FIGS. 1 and 6 to 12.

Initially, the screen 36, fastened to the fastening device 62, is in the storage position in the storage space 38, and the retractable support 34 is in the retracted configuration, as shown in FIG. 1.

A passenger begins by exerting pressure, oriented toward the inside of the armrest 16, on the part of the façade 22 defined by the wall 78. This results in unlocking the blocking mechanism, which was keeping the housing 64 in the retracted position. The housing 64 is then driven by the associated return member, and pivots around the pivot axis P-P' toward its released position, as shown in FIG. 8.

Once the housing 64 is in the released position, the passenger presses on the actuating button 97. This results in unlocking the locking mechanism 76 that was keeping the arm 60 in the retracted position. The arm 60 is then driven by the return member 80, and slides along the translation direction T-T' toward its deployed position, as shown in FIG. 9.

Owing to the design of the retractable support 34, which can be manipulated without the upper surface 20 of the armrest 16 being moved, the passenger can exert these actions easily while leaving his forearm or elbow resting on the armrest 16.

The passenger then grasps the second segment 92 and pivots the latter around the first pivot axis R1-R1', so as to bring the arm 60 into the extended configuration, as shown in FIG. 10.

The passenger next presses on the actuating button of the unlocking mechanism of the ejection system for ejecting the screen 36 outside the recess 126. This results in unlocking the plate of the ejection system, which, driven by the associated return member, moves toward its raised position. The plate drives the screen 36, the majority of which is freed from the recess 126.

The passenger then grasps the screen 36 and the fastening device 62, and places the reversible securing member 114 across from the fastening end 100 of the arm 60. The magnets 120, 122 cooperate, which results in securing the fastening device 62 to the fastening end 100, as shown in FIG. 6.

If the position of the screen 36 does not suit the passenger, he may adjust its orientation using the articulated link and the second pivot link. Furthermore, the passenger may easily tilt the screen 36 between the portrait mode and the landscape mode owing to the articulated link. Lastly, if the passenger sees that the screen 36 needs to be supplied with electricity, he can connect the latter to the power grid of the aircraft by connecting it to the electricity plug.

Furthermore, the passenger can use the cup holder 32 or the control interface 30 without hindrance while the support 34 is deployed.

When the passenger has finished using the screen 36 and wishes to put it away, he moves the fastening device 62 away from the arm 60, which results in separating the fastening device from the arm 60.

The passenger next stores the fastening device 62 and the screen 36 in the storage space 38. To that end, the passenger needs only move the fastening device 62 and the screen 36 into the opening 128, and exert pressure on the latter oriented toward the bottom of the recess 126, such that the latter descend in the recess 126 until reaching a stop. The passenger then releases this pressure, which causes a slight rising of the fastening device 62 and the screen 36, rising that is nevertheless quickly stopped by the locking mechanism, which snaps; the screen 36 is then in the storage position inside the recess 126.

The passenger next folds the arm 60 into its retracted configuration, then presses on the arm 60 in the translation direction T-T' and toward the bottom 84 of the receiving space 72, so as to push the arm 60 in the housing 64. The passenger maintains this pressing until the arm 60 is abutting. The passenger then releases this pressure, and the arm 60 rises slightly under the effect of the force of the return member 80, but this rising is quickly blocked by the locking mechanism 76, which snaps; the arm 60 is then retracted in the housing 64.

Lastly, the passenger pivots the housing 64 around the pivot axis P-P', so as to return it to the inside of the compartment 66. The passenger thus pivots the housing 64 until it is abutting. The passenger then releases the housing 64, which is then kept in the retracted position by the blocking mechanism.

What is claimed is:

1. A retractable support for a screen comprising:
   a support arm for the screen;
   a housing for receiving the arm in a retracted position inside the housing, the housing comprising a deployer configured for deploying the arm outside the housing; and
   a compartment defining a cavity for receiving the housing in a retracted position inside the compartment, the housing being mounted movably relative to the compartment between the retracted position and a free position outside the compartment,
   the housing being connected to the compartment in the retracted position and in the free position.

2. The retractable support according to claim 1 wherein the housing is mounted pivotable relative to the compartment around a pivot axis for the movement of the housing between the retracted and free positions.

3. The retractable support according to claim 1 wherein the deployer comprises a guide for guiding the arm in translation relative to the housing in a translation direction.

4. The retractable support according to claim 3 wherein the housing is mounted pivotable relative to the compartment around a pivot axis for the movement of the housing between the retracted and free positions, the pivot axis being substantially orthogonal to the translation direction.

5. The retractable support according to claim 1 wherein the arm is an articulated arm.

6. The retractable support according to claim 5 wherein the arm comprises first and second segments articulated relative to one another such that the second segment pivots relative to the first segment around a first rotation axis between a compact configuration, in which the first and second segments are oriented substantially parallel relative to one another, and an extended configuration, in which the first and second segments form an angle relative to one another.

7. The retractable support according to claim 6 wherein the deployer comprises a guide for guiding the arm in translation relative to the housing in a translation direction, the first segment being elongated in an elongation direction substantially parallel to the translation direction.

8. The retractable support according to claim 6 wherein the first segment is elongated in an elongation direction substantially orthogonal to the first rotation axis.

9. The retractable support according to claim 6 wherein the first segment defines a proximal articulation end of the arm to the housing, and the second segment defines a distal end for fastening the screen to the arm.

10. The retractable support according to claim 6 wherein the first segment is elongated in an elongation direction and comprises a first rigid part, defining a first longitudinal end of the first segment, and a second rigid part, defining a second longitudinal end of the first segment, the first and second parts being mounted rotatably relative to one another around a second rotation axis, the second rotation axis being substantially parallel to the elongation direction.

11. The retractable support according to claim 10 wherein the first segment defines a proximal articulation end of the arm to the housing and the second segment defines a distal end for fastening the screen to the arm, the second segment being articulated to the second part of the first segment, the first longitudinal end of the first segment constituting the proximal end of the arm.

12. The retractable support according to claim 1 further comprising a snap-lock for locking the arm in the retracted position, the snap-lock being configured for being unlocked under the effect of a pressure exerted on the arm toward the bottom of the housing.

13. The retractable support according to claim 1 further comprising a snap-block configured to block the housing in the retracted position, the snap-block configured for being unblocked under the effect of a pressure exerted on the housing toward the bottom of the cavity.

14. The retractable support according to claim 1 wherein the deployer comprises a guide for guiding the translation of the arm relative to the housing in a translation direction, and the arm is an articulated arm comprising a first segment, elongated in a first elongation direction substantially parallel to the translation direction, the first segment defining a proximal end for articulation of the arm to the housing, and a second segment, with a length shorter than that of the first segment, the second segment being elongated along a second elongation direction and defining a distal end for fastening the screen to the arm, the first and second segments each having an elongated face extending substantially parallel to the elongation direction of the segment and being articulated relative to one another such that the second segment pivots relative to the first segment around a first rotation axis between a compact configuration, in which the first and second segments are oriented substantially parallel relative to one another and are placed side by side along their elongated faces, and an extended configuration, in which the first and second segments form an angle relative to one another.

15. The retractable support according to claim 1 wherein the compartment comprises a stop configured for cooperating with a complementary stop formed on the housing, to prevent the pivoting of the housing by an angle larger than 20° between the retracted and free positions.

16. A cabin seat for an aircraft comprising at least one of the retractable support according to claim 1.

17. The cabin seat according to claim 16 further comprising an armrest in which the compartment of the retractable support is housed.

18. The cabin seat according to claim 17 wherein the housing of the retractable support includes a wall which, when the housing is in the retracted position, defines at least part of a façade of the armrest.

19. A retractable support for a screen comprising:
a support arm for the screen;
a housing for receiving the arm in a retracted position inside the housing, the housing comprising a deployer configured for deploying the arm outside the housing; and
a compartment defining a cavity for receiving the housing in a retracted position inside the compartment, the housing being mounted movably relative to the compartment between the retracted position and a free position outside the compartment,
wherein the housing is mounted pivotable relative to the compartment around a pivot axis for the movement of the housing between the retracted and free positions.

20. A retractable support for a screen comprising:
a support arm for the screen;
a housing for receiving the arm in a retracted position inside the housing, the housing comprising a deployer configured for deploying the arm outside the housing; and
a compartment defining a cavity for receiving the housing in a retracted position inside the compartment, the housing being mounted movably relative to the compartment between the retracted position and a free position outside the compartment,
wherein the deployer comprises a guide for guiding the arm in translation relative to the housing in a translation direction.

* * * * *